United States Patent
Ito

(10) Patent No.: US 7,475,361 B2
(45) Date of Patent: Jan. 6, 2009

(54) DATA PROCESSING DEVICE, DATA PROCESSING METHOD, AND STORAGE MEDIUM

(75) Inventor: Chitoshi Ito, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 665 days.

(21) Appl. No.: 10/311,436

(22) PCT Filed: Jun. 19, 2001

(86) PCT No.: PCT/JP01/05218

§ 371 (c)(1),
(2), (4) Date: Dec. 18, 2002

(87) PCT Pub. No.: WO01/98890

PCT Pub. Date: Dec. 27, 2001

(65) Prior Publication Data

US 2003/0169296 A1    Sep. 11, 2003

(30) Foreign Application Priority Data

Jun. 19, 2000    (JP) .................. 2000-182524

(51) Int. Cl.
   *G06F 3/048*    (2006.01)
(52) U.S. Cl. .................................... 715/804
(58) Field of Classification Search ................ 715/769, 715/770, 804, 758
   See application file for complete search history.

(56) References Cited

U.S. PATENT DOCUMENTS

| | | | | |
|---|---|---|---|---|
| 5,339,392 A | * | 8/1994 | Risberg et al. | 715/762 |
| 5,515,491 A | * | 5/1996 | Bates et al. | 715/754 |
| 5,680,562 A | * | 10/1997 | Conrad et al. | 715/797 |
| 5,801,701 A | * | 9/1998 | Koppolu et al. | 715/821 |
| 6,067,551 A | * | 5/2000 | Brown et al. | 707/203 |
| 6,640,010 B2 | * | 10/2003 | Seeger et al. | 382/229 |
| 2002/0001000 A1 | * | 1/2002 | Shpilberg et al. | 345/804 |

FOREIGN PATENT DOCUMENTS

| | | |
|---|---|---|
| JP | A 5-94273 | 4/1993 |
| JP | A 11-65795 | 3/1999 |
| JP | A 11-185049 | 7/1999 |

OTHER PUBLICATIONS

Screen Dumps of Adobe Acrobat 5.0 (Mar. 22, 2001, pp. 1-13).*
Screen Dumps of Adobe Acrobat 4.0 (1999, pp. 1-7).*

* cited by examiner

*Primary Examiner*—Stephen S Hong
*Assistant Examiner*—Le Nguyen
(74) *Attorney, Agent, or Firm*—Oliff & Berridge, PLC

(57) ABSTRACT

A data processing device capable of rapidly processing data through simple operations by the user without requiring a tape editor to be already executing when capturing data from a Web browser and supplying that data to the tape editor and without requiring the user to start up the tape editor. A data capture controller 22 captures prescribed data from the Web browser 31 in a data supply controller 23 based on operations of a keyboard 12 and/or mouse 13. The data supply controller 23 launches the tape editor 32 and supplies the captured data to the same. At this time, the process command unit 24 instructs the tape editor 32 regarding what process to execute, and printing by the tape printing device 2 is performed automatically.

20 Claims, 10 Drawing Sheets

EDIT MARK

PRINT MARK

DROP MARK

DATA PROCESSING DEVICE, DATA PROCESSING METHOD, AND STORAGE MEDIUM

TECHNICAL FIELD

The present invention relates to a data processing device and method and a storage medium for storing the data processing method capable of quickly executing a printing process or the like on prescribed data through simple operations.

BACKGROUND ART

Through recent advances in computer technology and the spreading popularity of the Internet, computer users are able to quickly access a wide variety of data via the World Wide Web (WWW) and easily display desired text and images in browsing software, generally called a Web browser. However, often it is necessary to print this data onto paper in order to refer to the accessed data when the user is out of the office, for example, and cannot use a computer. The simplest method of doing this has been to use the printing function of the browser to print the text and images exactly as they are displayed in the browser onto A4-size paper, for example.

DISCLOSURE OF THE INVENTION

However, while it is often the case that only a small portion of the data displayed in the browser is actually necessary to the user, the printing function of the browser prints out all displayed data, including data that is unnecessary. This results in an increased number of printed sheets of paper that become heavy and can be difficult to carry. This amount of paper takes up space for storage and takes up much of the user's time when searching for required information, not to mention being a wasteful use of paper.

To avoid these problems, it is necessary to copy only the necessary data from the data displayed in the Web browser into a word processing program or the like using copy and paste functions, for example. When necessary, the user edits the data and then must perform an operation to print the data from the word processing program.

To copy required information from the Web browser to a word processing program or the like, the user must either have the word processing program running constantly or start up the word processing program each time it is needed for use. However, running the word processing program constantly is not desirable, since the program consumes the system resources of the computer. On the other hand, launching the word processing program each time the program is needed is inconvenient and hinders speedy data processing.

In view of the foregoing, it is an object of the present invention to provide a data processing device and method and a storage medium for storing the data processing method that do not require a second application to be already executing when capturing data from a first application, such as a browser, and supplying that data to the second application, such as a word processing program, and moreover are capable of rapidly processing data through simple operations by the user without requiring the user to start up the second application.

These objects will be attained by a data processing device according to the present invention comprising data selecting means capable of selecting desired data from data displayed on a display device through a process by a first application; data supplying means for supplying the data selected by the data selecting means to a second application as the object of a preset data process of the second application, without requiring an access of the second application; and process controlling means for executing the preset data process on the supplied data using the second application.

Further, the data processing method of the present invention includes a step for selecting data from data displayed on a display device through the process of a first application; a step for supplying the data selected in the first step to a second application as the object of a preset data process in the second application without requiring access to the second application; and a step for executing the preset data process on the supplied data using the second application.

A storage medium according to the present invention that can be read by a computer, the storage medium storing programs for controlling the computer to function as a data processing device that performs data processing through first and second applications according to input controls based on a display on the display device, wherein the data processing device comprises data selecting means capable of selecting desired data from data displayed on a display device through a process by a first application; data supplying means for supplying the data selected by the data selecting means to a second application as the object of a preset data process of the second application, without requiring an access of the second application; and process controlling means for executing the preset data process on the supplied data using the second application.

In the present invention, any type of application can be used as the first and second applications and any combination thereof. For example, the applications might be a Web browser, word processing program, spreadsheet software, database, text editor, image processor, or the like.

With the construction described above, selected data is captured or extracted from data displayed by the first application and can be automatically supplied to the second application by starting this second application if the application is not currently running. Accordingly, it is not necessary to start up the second application in advance. Moreover, the user can perform speedy data processing through simple operations without needing to start up the second application. Since data can be supplied to this second application without performing any operations on the second application, the user can capture data quickly and smoothly by simply concentrating on the first application alone without being preoccupied with the second application.

BEST MODE FOR CARRYING OUT THE INVENTION

Next, preferred embodiments of the present invention will be described while referring to the accompanying drawings.

Figure 1:
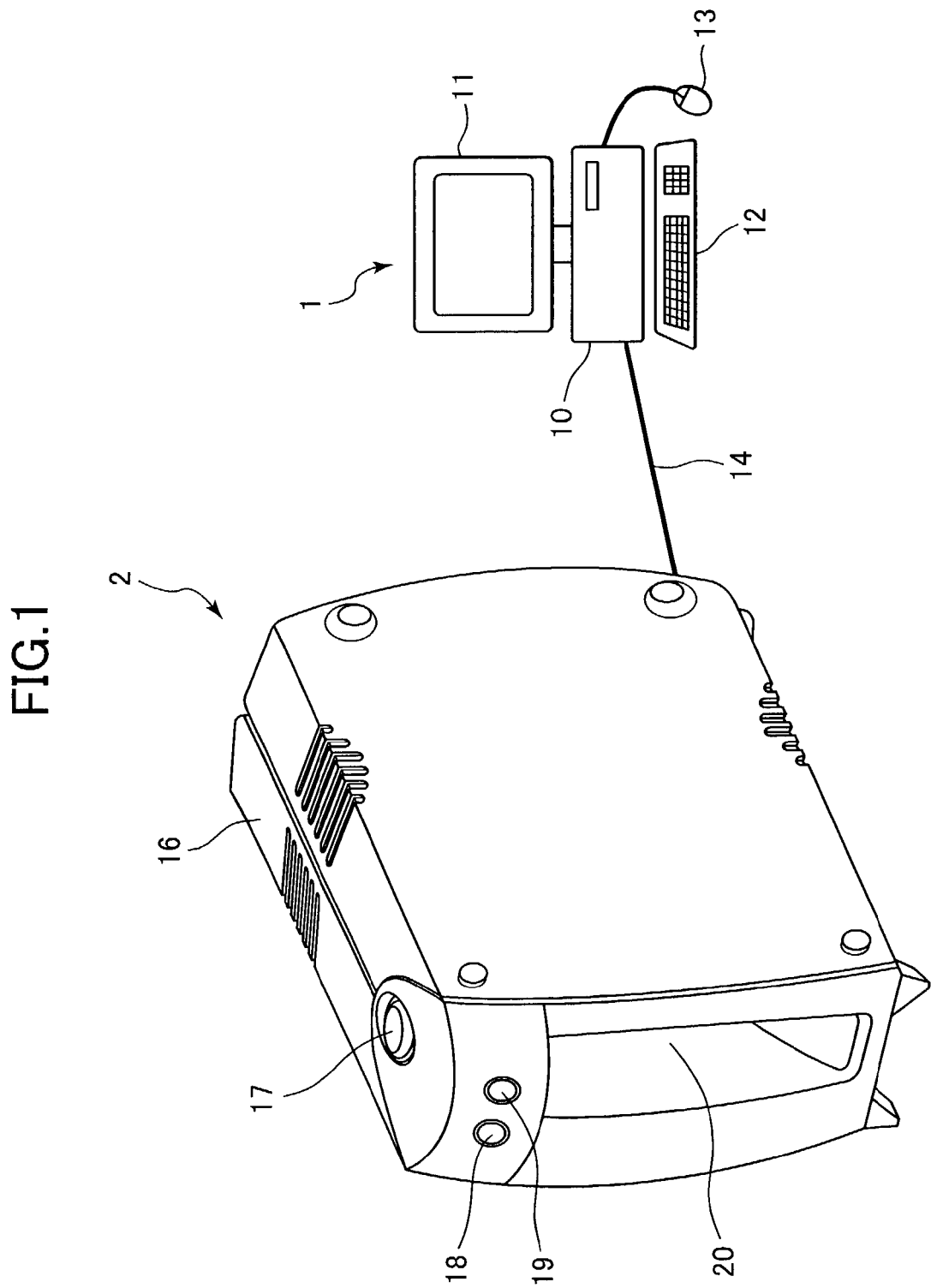
FIG. 1 is a sketch of a personal computer serving as the data processing device of one preferred embodiment of the present invention and a tape printing device connected to the personal computer.

FIG. 1 is a sketch of a personal computer serving as the data processing device of the preferred embodiment and a tape printing device connected to the personal computer. The personal computer 1 shown in FIG. 1 includes a system unit 10; and a display 11, a keyboard 12, and a mouse 13 connected to the system unit 10. The personal computer 1 is connected to a tape printing device 2 via a cable 14. Various devices are provided in the system unit 10 of the personal computer 1, including a CPU, ROM, RAM, hard disk, floppy disk drive, and CD-ROM drive. The personal computer 1 can also be connected to the Internet via a communication device, such as a modem, a LAN, or the like.

In the present embodiment, the hard disk in the system unit 10 stores an operating system, such as Microsoft Windows (trademark); various common application programs, such as a Web browser and a word processing program; and proprietary editing software (hereinafter referred to as "tape editor") for editing print data for the tape printing device 2. The hard disk further stores an application program (hereinafter referred to as "assistant software") for supplying desired portions of data selected from data displayed on the display 11 through a Web browser or other application to a separate application, such as the tape editor.

The Web browser can display on the display 11 not only text data and/or image data stored on the hard disk, floppy disk, CD-ROM, and the like, but also text data and/or image data transferred to the personal computer 1 from a Web server on the Internet. Here, text data denotes data for character arrays displayed by the Hypertext Markup Language (HTML), for example. Image data denotes data of such formats as GIF, JPEG, and BMP pasted into an HTML document using HTML tags.

After the tape editor receives and edits such text data and image data, either through an automated process and/or based on user operations, the tape editor performs a process to print the data on a tape mounted in the tape printing device 2 and to cut the tape at a prescribed position. The user can edit the data content to be printed on the tape, the cutting position, and the like by performing operations on the personal computer 1 while viewing the display 11.

The assistant software is a relatively compact, light application, sometimes referred to as a portal application, for capturing data from the browser and supplying the data to the tape editor. By being light, the application can reside in memory without consuming a large amount of system resources, thereby contributing to stable operations.

The tape printing device 2 can internally accommodate an ink ribbon cassette and a tape, serving as the printing medium, that is wound into a roll. Desired text and images can be printed on the tape by a thermal head in the tape printing device 2 that transfers ink borne on the ink ribbon to the surface of the tape through a thermal transfer process. The tape and ink ribbon cassette can be mounted at prescribed positions in the tape printing device 2 by pressing down on a cover open button 17 to open a cover 16. Also provided on the outer surface of the casing of the tape printing device 2 are a power switch 18, an LED 19 for displaying various states of the tape printing device 2 by turning on and flashing lights and the like, and a tape outlet 20. As shown in FIG. 1, the tape printing device 2 can be arranged both vertically and horizontally.

Figure 2:
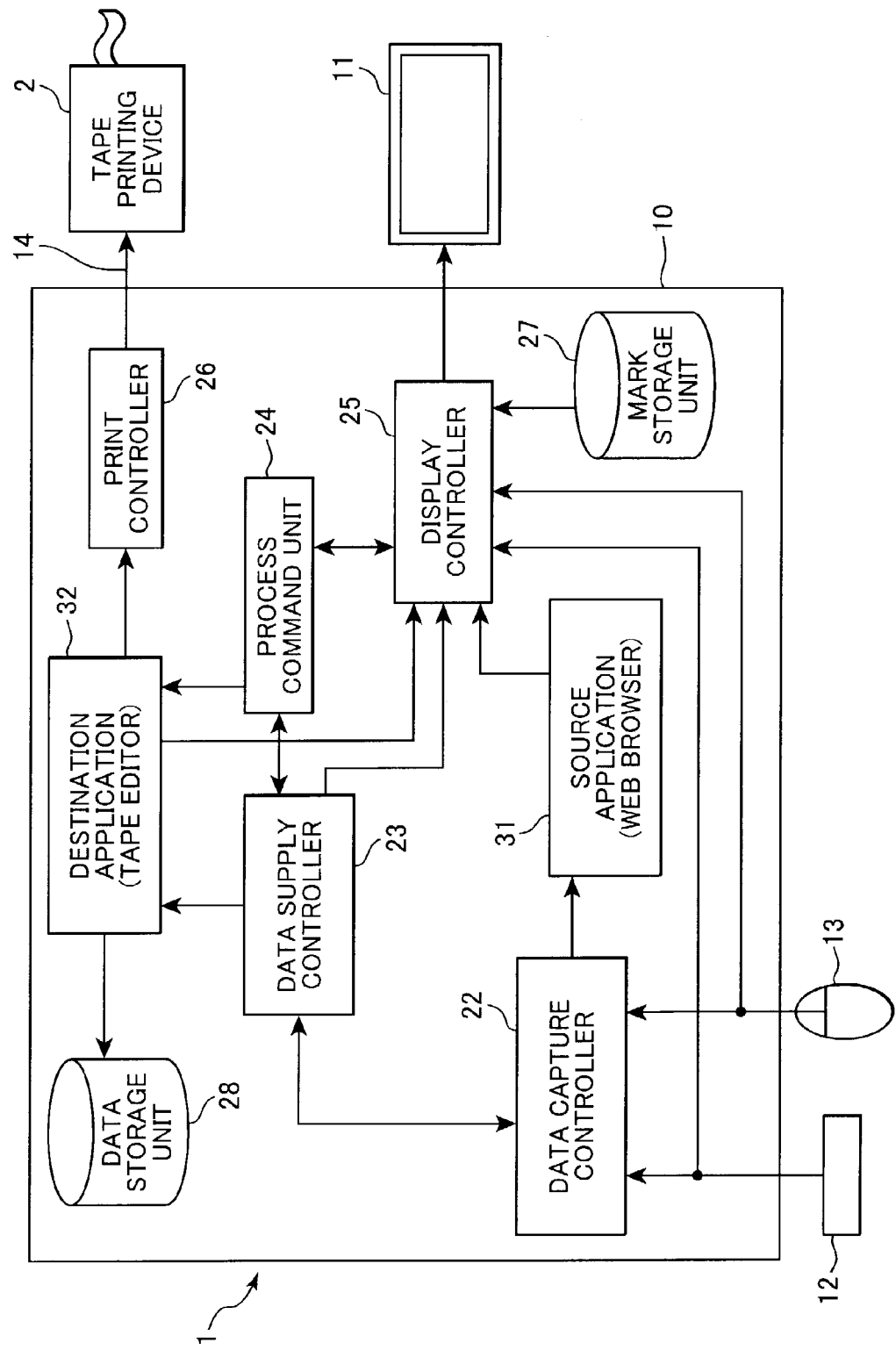
FIG. 2 is a block diagram showing the personal computer of FIG. 1 according to the preferred embodiment of the present invention.
Figure 3:
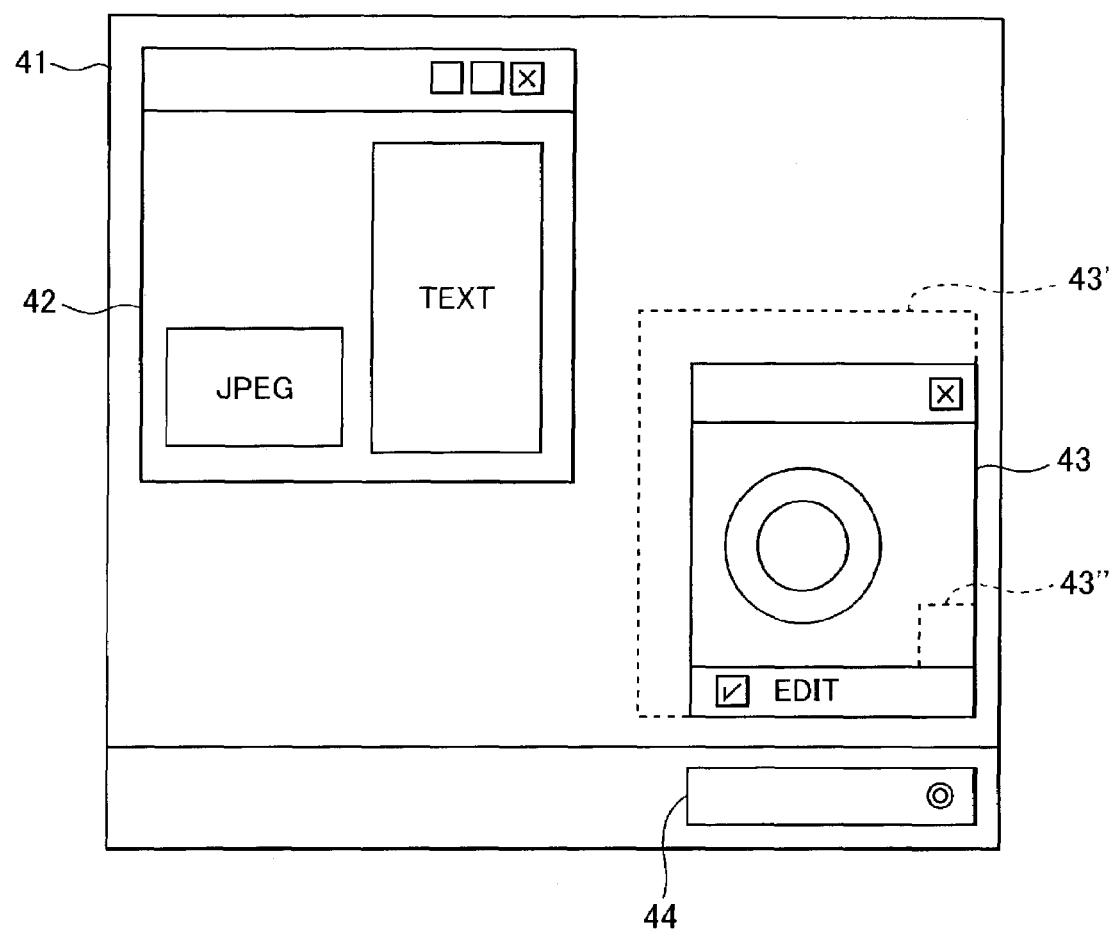
FIG. 3 is a conceptual drawing showing a sample display screen on the display according to the preferred embodiment of the present invention.
Figure 4:
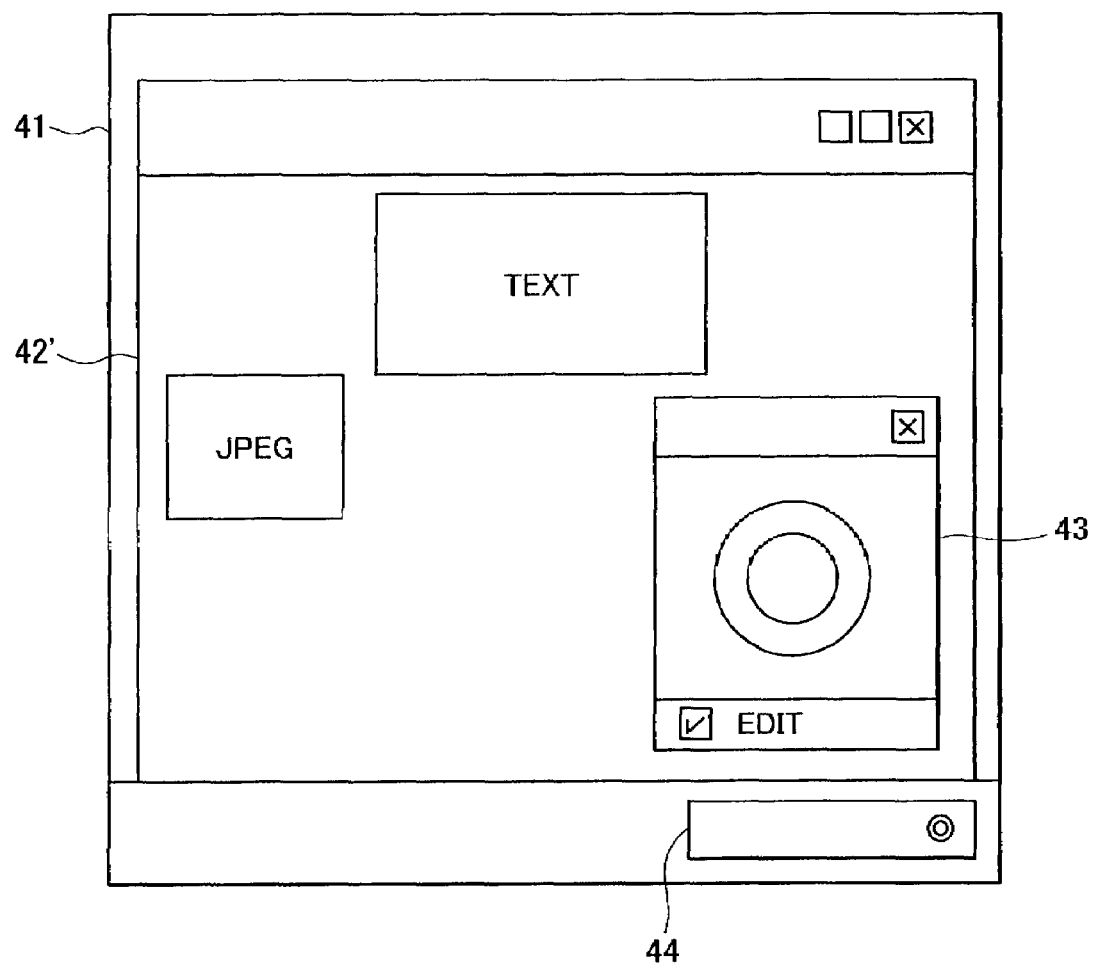
FIG. 4 is a conceptual drawing showing a sample display screen on the display according to the preferred embodiment of the present invention.
Figure 5:
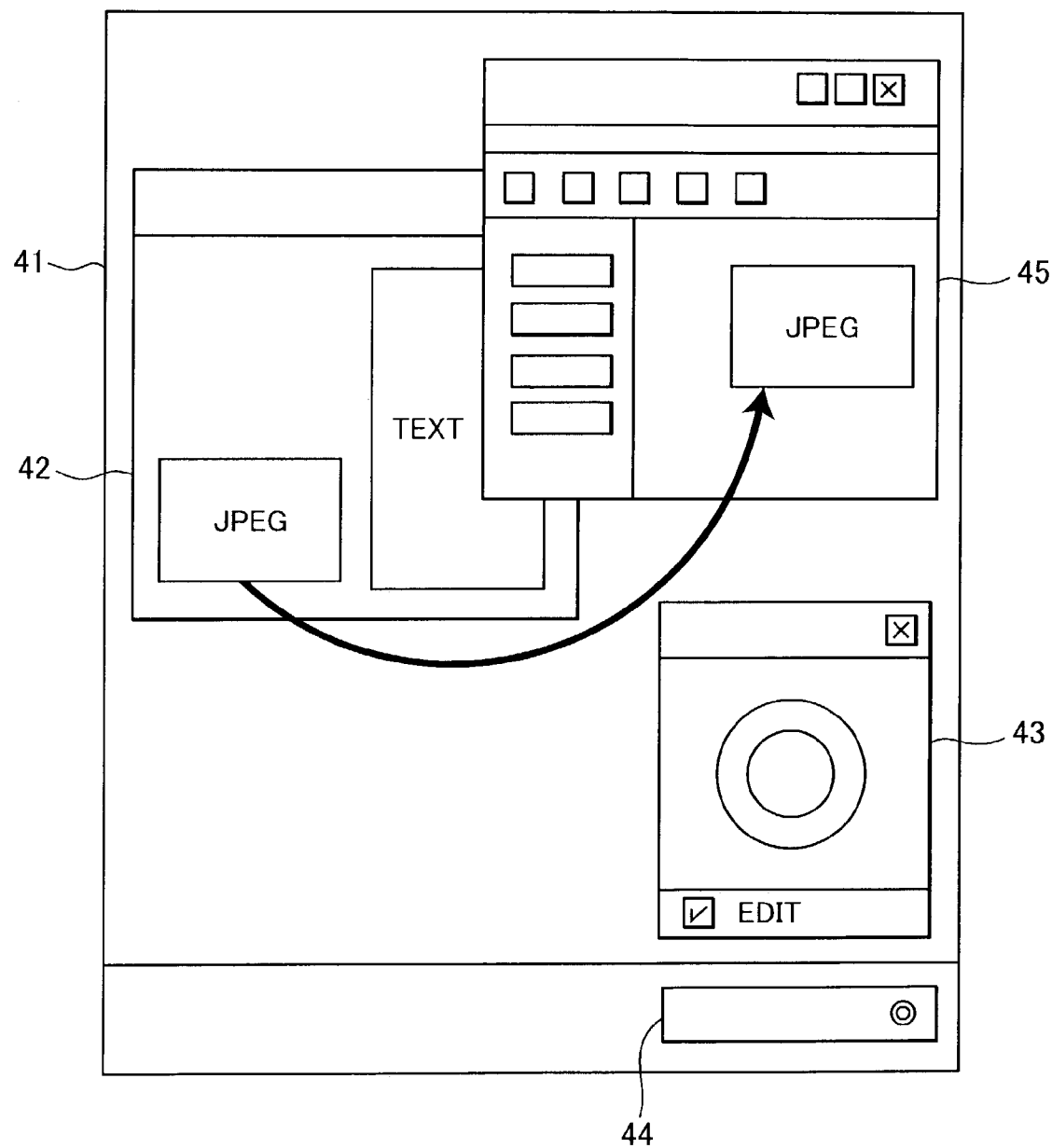
FIG. 5 is a conceptual drawing showing a sample display screen on the display according to the preferred embodiment of the present invention.
Figure 6A:
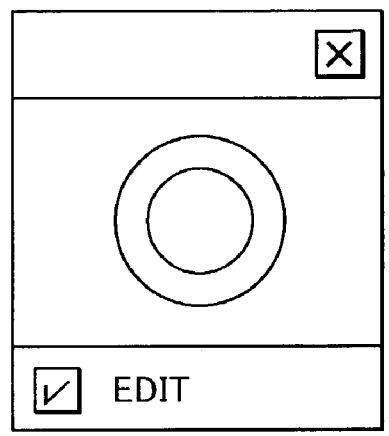
FIGS. 6(a)-6(c) are conceptual drawings showing the display area of the assistant software according to the preferred embodiment of the present invention, FIG. 6(a) showing an example display of an edit mark, FIG. 6(b) showing an example display of a print mark, and FIG. 6(c) showing an example display of a drop mark.
Figure 6B:
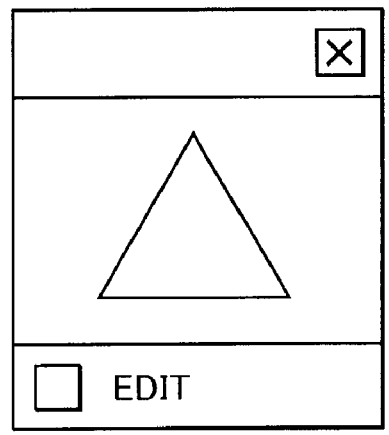
Figure 6C:
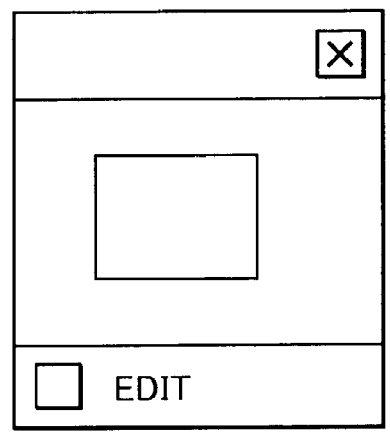

Next, the steps of the data process performed by the personal computer 1 will be described in more detail with reference to FIGS. 2-10. In this example, desired data is captured from a Web browser and supplied to the tape editor. FIG. 2 is a block diagram showing the personal computer of FIG. 1 according to the preferred embodiment. FIGS. 3-5 are conceptual drawings showing sample displays on the display 11 according to the preferred embodiment. FIG. 6 is also a conceptual drawing showing the display area of the assistant software. FIGS. 7-10 are flowcharts showing the steps in the data process according to the preferred embodiment.

After installing an operating system and the assistant software in the personal computer 1, the system unit 10 of the personal computer 1 includes, as shown in FIG. 2, a data capture controller 22, a data supply controller 23, a process command unit 24, a display controller 25, a print controller 26, a mark storage unit 27, and a data storage unit 28. The units 22-28 are implemented through combinations of such hardware as the CPU, RAM, and ROM; the operating system, and the assistant software.

When the user selects data from among data displayed on a Web browser 31 serving as the source application using the keyboard 12 and/or mouse 13, the data capture controller 22 controls the process for capturing the selected data and supplying this data to the data supply controller 23.

In the data processing device of the present embodiment, the data capture function can capture data using any of the following methods: a drag-and-drop operation for dragging and dropping the data to be captured into a prescribed display area, a screen capture operation, and a copy operation. The user can perform any of these operating methods that he or she finds most suitable to capture data easily. It is preferable that the user be able to select a desirable method from these three operations according to the application being used, the computer environment, and the like.

The data supply controller 23 controls the process for supplying the data captured from the Web browser 31 to a tape editor 32 serving as the destination application. The data supply controller 23 starts up the tape editor before supplying data thereto. In the present embodiment, the tape editor is the only destination application, but it is preferable that the user be able to instruct the data supply controller 23 using the keyboard 12 and/or mouse 13 to which application the data should be supplied when a plurality of destination applications are available. In this case, the data supply controller 23 should notify the display controller 25 to which application data is being supplied, and the display controller 25 modifies the content displayed on the display 11 (specifically the mark in a display area 43 (see FIG. 3) of the assistant software) based on this notification.

The process command unit 24 instructs the tape editor 32 which process to be executed, as indicated by the user via the keyboard 12 and/or mouse 13. To accomplish this in the preferred embodiment, an Edit flag is set in the process command unit 24. The process command unit 24 also notifies the display controller 25 of the process to be executed by the tape editor 32. The display controller 25 modifies the content displayed on the display 11 (specifically the mark in the display area 43 (see FIG. 3) for the assistant software and the display/no display status of the tape editor) based on this notification.

The display controller 25 controls the image displayed on the display 11. Various data are issued to the display controller 25, including display content for the Web browser 31 and tape editor 32, operations by the keyboard 12 and/or mouse 13, and instructions from the data supply controller 23 and process command unit 24. The display controller 25 determines the content to be displayed on the display 11 based on these data. The mark storage unit 27 is connected to the display controller 25 and stores a plurality of marks related to the assistant software that is depicted on the display 11.

The print controller 26 controls the process for printing data content in the tape editor 32 on the tape printing device 2. In the present embodiment, the print controller 26 can be made active automatically after the tape editor 32 is launched and data is automatically edited, or the print controller 26 can be made active after the tape editor 32 is launched and the user edits the data and issues a print command. The data storage unit 28 is used to store data supplied to the tape editor 32.

As shown in FIG. 3, the Web browser is displayed as the source application in a display area (window) 42 while the assistant software is displayed in the display area 43 within a display screen 41 of the display 11. In the example of FIG. 3, a single JPEG image is displayed along with a character array described in HTML in the display area 42 of the Web browser. A mark of two concentric circles (◎) is displayed in the center of the display area 43 of the assistant software along with an "Edit" check box below the mark, as shown in the enlarged view of FIG. 6(*a*). The "Edit" check box has been checked by a user mouse click. If data is captured when the "Edit" check box is checked, as described later, the tape editor is displayed in the display screen 41 along with the captured data, enabling the user to edit this captured data. Further, the same mark as that indicated in the center of the display area 43 (the ◎ in FIG. 3) is also displayed in an indicator area 44 on the taskbar located on the bottom of the display screen 41.

In the present embodiment, the assistant software can either be automatically started up according to instructions from the driver of the tape printing device 2 when the power of the tape printing device 2 is turned ON and while the operating system of the personal computer 1 is executing, or can be launched according to instructions from the user, such as a mouse click over a prescribed mark or the like. Since the assistant software becomes a resident program when the power of the tape printing device 2 is turned ON in the present embodiment, it is possible to supply data to the tape editor quickly.

The size of the display area 43 can be modified to an arbitrary size through the control of the display controller 25 based on the user's instructions. For example, as shown in FIG. 3, it is possible to modify the display area 43 to a slightly larger display area 43' (or a smaller display area 43"). Since the size of the display area 43 can be modified to suit various conditions, such as the user's preference and the size of the display screen 41, it is possible to construct an environment that facilitates data processing for the user. Note that it is not absolutely necessary to provide the display area 43 shown in FIG. 3 for the assistant software. For example, it is possible to simply display a mark in the indicator area 44 indicating that the assistant software has been launched.

As shown in FIG. 4, when the display area 42 is enlarged to a display area 42' approximately the same size as the display screen 41, thereby overlapping the display area 43 of the assistant software, the display area 43 is always displayed on top of the display area 42' and on top of other display areas, regardless of which display area is active. Similarly, when the display area 42 is left at the same size but moved to a position overlapping the display area 43, the display area 43 again remains on top of the display area 42 and other display areas. The display area 43 can always be displayed on top of other display areas by configuring the display controller 25 to control the attributes of the display area 43 related to the screen display at the operating system level. By always displaying the display area 43 on top in this way, it is easy to drag and drop data into the display area 43, as described later. Further, the user is always able to check the mark indicated in the display area 43 of the assistant software.

Figure 7:
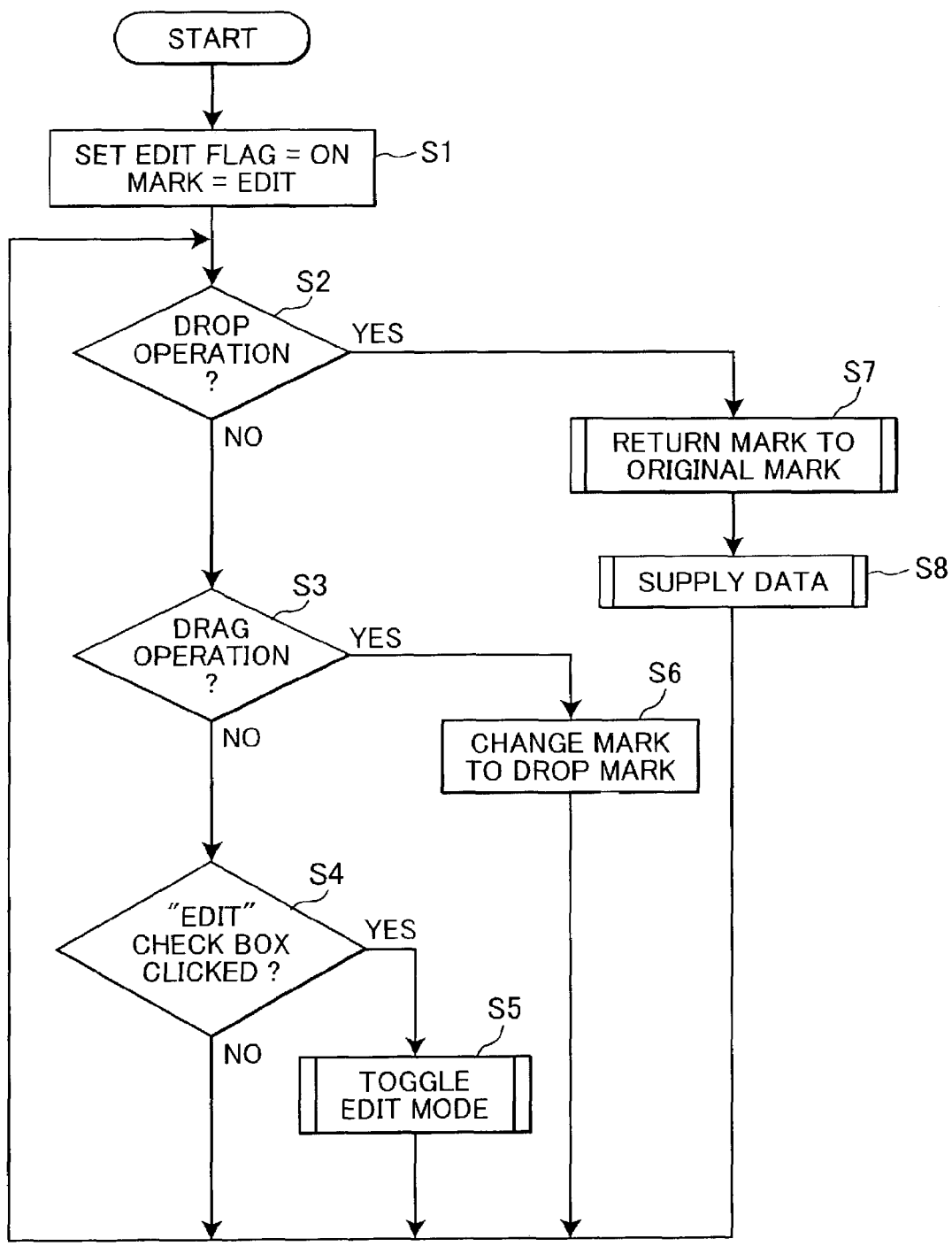
FIG. 7 is a flowchart illustrating the steps in the data process according to the preferred embodiment of the present invention.

In the present embodiment, when the assistant software is started up due to the power of the tape printing device 2 being turned on, as shown in Step S1 of FIG. 7, the Edit flag, which indicates whether to edit data with the tape editor, is set to a default value of ON and written to the process command unit 24. At the same time, the "Edit" check box is checked in the display area 43 due to this initialization process. Further, the double concentric circle mark (◎), as shown in FIG. 6(*a*), is selected from the mark storage unit 27 and displayed as the mark in the display area 43.

In Step S2, the data capture controller 22 determines whether data displayed in the display area 42 of the Web browser has been dropped in the display area 43 of the assistant software through a drag-and-drop operation (click and shoot operation) based on operations of the mouse 13. If the data capture controller 22 determines that a drop operation has not been performed in the display area 43 (No in S2), then the data capture controller 22 determines in S3 based on operations of the mouse 13 whether data is currently being moved within the display screen 41 by a drag operation. If the data capture controller 22 determines that no data is being dragged (No in S3), then the process command unit 24 determines in S4 whether the "Edit" check box in the display area 43 has been checked by the mouse 13. If the process command unit 24 determines that the "Edit" check box has not been checked (No in S4), then the same process is repeated from Step S2. However, if the process command unit 24 determines that the "Edit" check box has been checked (Yes in S4), the process advances to Step S5.

Figure 8:
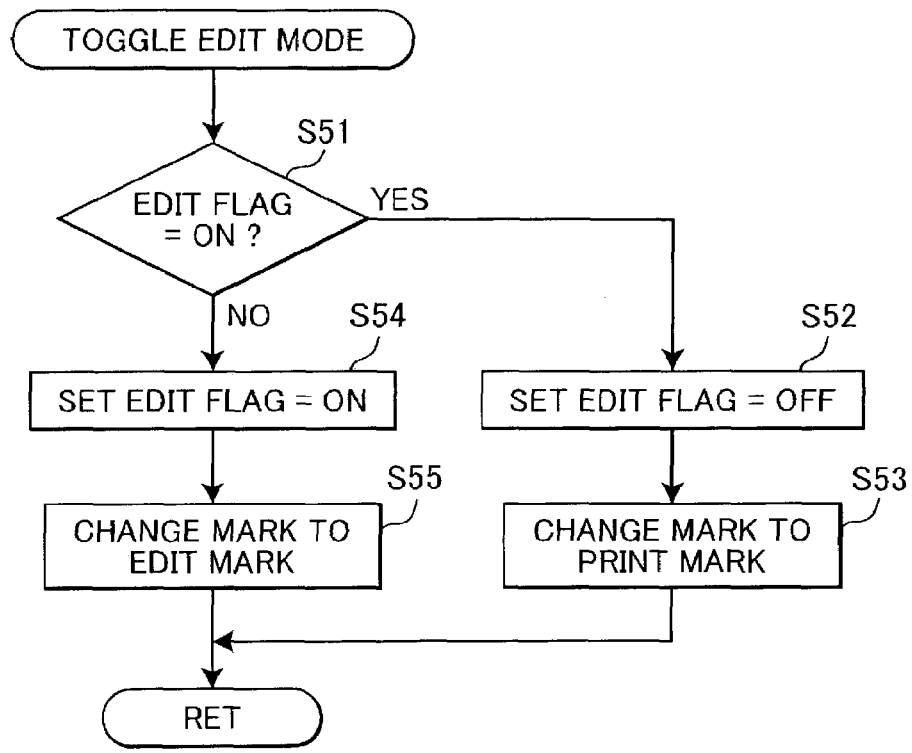
FIG. 8 is a flowchart illustrating the steps in the data process according to the preferred embodiment of the present invention.
Figure 9:
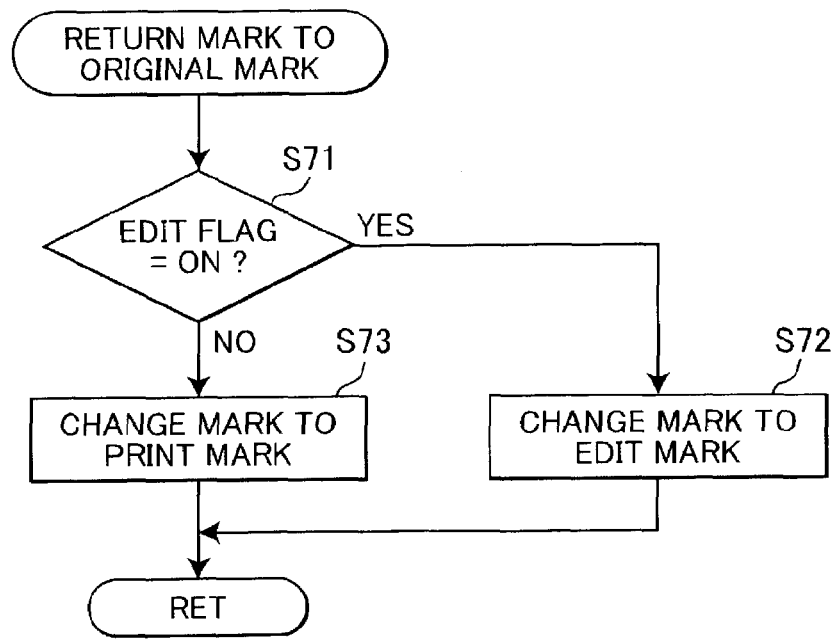
FIG. 9 is a flowchart illustrating the steps in the data process according to the preferred embodiment of the present invention.

In Step S5, shown in FIG. 8, first the process command unit 24 determines whether the Edit flag is set to ON in Step S51. If the process command unit 24 determines that the Edit flag is ON (Yes in S51), then the Edit flag is set to OFF in S52. In Step S53, the display controller 25 changes the mark in the display area 43 to a print mark extracted from the mark storage unit 27, for example a triangular mark (Δ), as shown in FIG. 6(*b*). If the process command unit 24 determines that the Edit flag is OFF in S51 (No in S51), then the Edit flag is set to ON in S54. In Step S55, the display controller 25 changes the mark in the display area 43 to an Edit mark extracted from the mark storage unit 27 (for example, the double concentric circles ◎ shown in FIG. 6(*a*)).

However, if the data capture controller 22 determines that data is currently being dragged in S3 (Yes in S3), then the display controller 25 changes the mark in the display area 43 to a drop mark extracted from the mark storage unit 27 (such as a square mark □, as shown in FIG. 6(*c*)). Hence, in the present embodiment, three types of marks have been prepared for display in the display area 43: the edit mark shown in FIG. 6(*a*), the print mark shown in FIG. 6(*b*), and the drop mark shown in FIG. 6(*c*). These marks are selected from the available marks and displayed based on the user's actions. Accordingly, the user can confirm at a glance the current setting status, data processing status, or the like based on the mark displayed in the display area 43.

In Step S2, if the data capture controller 22 determines that a drop operation was executed in the display area 43 (Yes in S2), then the image and/or text data selected by a drag of the mouse 13 is captured in the data supply controller 23 and the process advances to Step S7 to change the drop mark in the display area 43 back to the original mark based on the current Edit flag. To achieve this, the process command unit 24 determines whether the current Edit flag is set to ON in Step S71, shown in FIG. 9. If the Edit flag is set to ON (Yes in S71), then the mark in the display area 43 is changed in S72 to the edit mark extracted from the mark storage unit 27. However, if the Edit flag is set to OFF (No in S71), then the mark in the display area 43 is changed in S73 to the print mark extracted from the mark storage unit 27.

Figure 10:
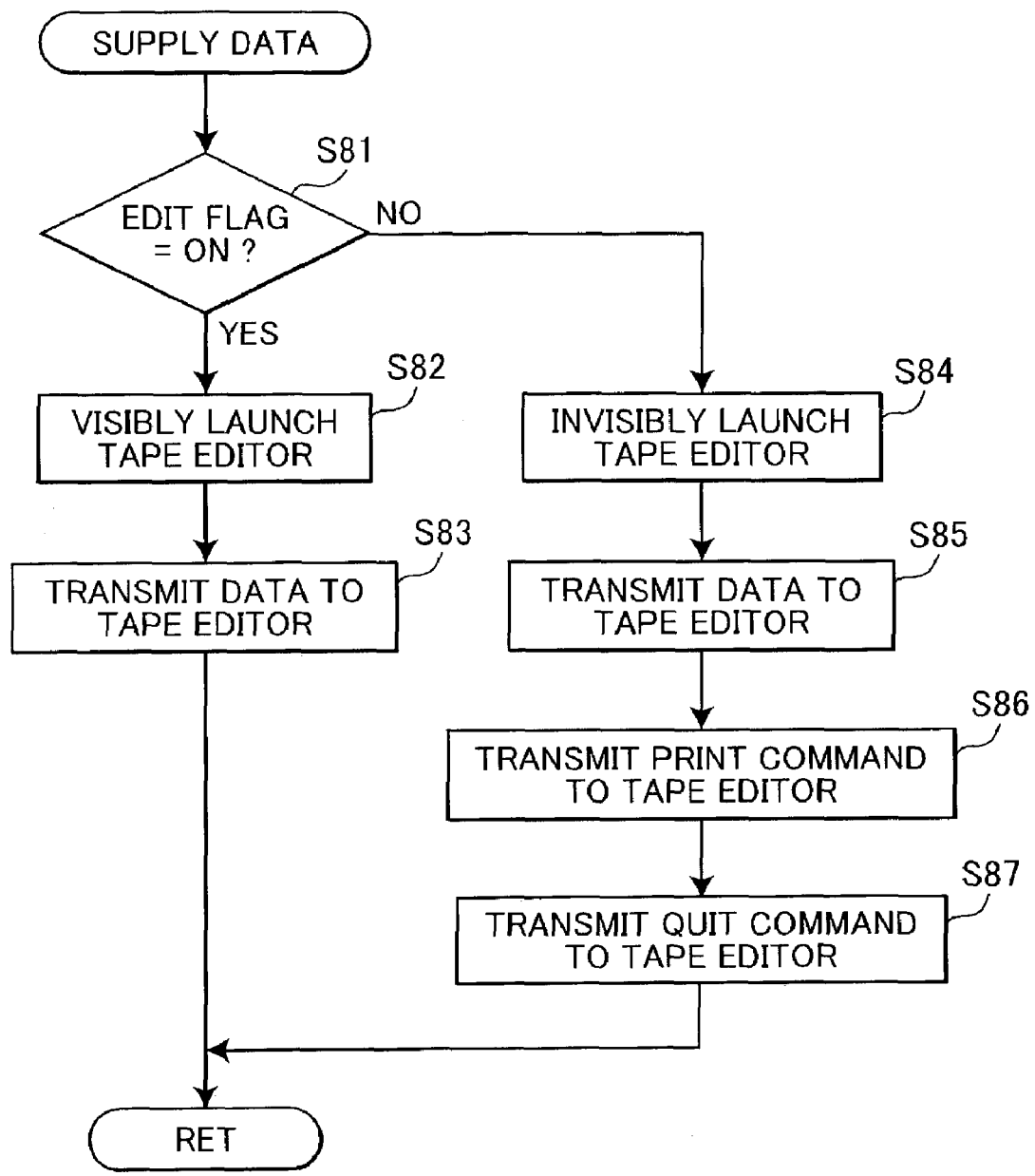
FIG. 10 is a flowchart illustrating the steps in the data process according to the preferred embodiment of the present invention.

After the mark in the display area 43 is returned to the original mark in the process of Step S7, the process advances to Step S8. In Step S8, a process is executed to supply the data captured in the data supply controller 23 through the drag-and-drop operation to the tape editor. To achieve this, the process command unit 24 determines in S81 whether the Edit flag is currently set to ON, as shown in FIG. 10. If the Edit flag is set to ON (Yes in S81), then the data supply controller 23 launches the tape editor in a visible manner in Step S82, that is, displays the tape editor in the display screen of the display 11. In Step S83, the captured data is transferred from the data supply controller 23 to the tape editor, and the process command unit 24 notifies the tape editor of the user's wish to edit data. For example, when a JPEG image is captured from the Web browser, the image is supplied to the tape editor while retaining its data format, as shown in FIG. 5, and the image is displayed inside a display area 45 of the tape editor. Accordingly, the user can perform an appropriate image process on the JPEG image by operating the tape editor and subsequently print the data or store the data on the hard disk.

In Step S81, if the Edit flag is set to OFF (No in S81), then the tape editor is started up in a non-display mode in Step S84, that is, the tape editor is not displayed in the display screen of the display 11. In Step S85, the captured data is transferred from the data supply controller 23 to the tape editor. In S86, a print command indicating that printing should begin immediately without editing by the user is transferred to the tape editor. As a result, the print controller 26 becomes active and the printing is executed by the tape printing device 2. It is preferable that the tape editor performs data editing by automatically determining the sizes of text and images, the layout, and other styles to achieve a readable printout, and by editing the data automatically according to these determinations. In Step S87, the process command unit 24 transfers a quit command to the tape editor, and the tape editor quits. After the process of Step S8 is completed, the same operation is repeated from Step S2.

In the method of the present embodiment described above, data selected from among data displayed in a browser can be captured. The tape editor can be started up and the data can be automatically supplied to the tape editor. Accordingly, it is not necessary for the tape editor to be already running and, moreover, the user can print desired data quickly and through simple operations without performing an operation to startup the tape editor. Since data can be supplied to the tape editor without operating the same, the user need not worry about the tape editor, but can concentrate on the browser when capturing data and can quickly and smoothly perform a data capture. By checking or unchecking the "Edit" check box with a mouse click, the user can set the operations of the tape editor to be executed after data is supplied thereto. Accordingly, it is possible to direct the tape editor selectively to execute processes according to the user's wishes.

In the embodiment described above, the drag-and-drop operation using the mouse 13 is described as an example of the method for capturing data. However, data capture by the data capture controller 22 can also be performed by first selecting data using a mouse drag or keyboard operation and then performing a copy operation. By performing a copy operation, the selected data is copied to the clipboard, which is a component of the data supply controller 23. Data capture by the data capture controller 22 can also be performed by a screen capture operation in which a rectangular area selected by the mouse from among data displayed in the display 11 is captured as bitmap image data. Therefore, in the present embodiment, the user can capture data by any one of these operating methods deemed appropriate by the user, thereby facilitating the data capture operation.

Figure 11:
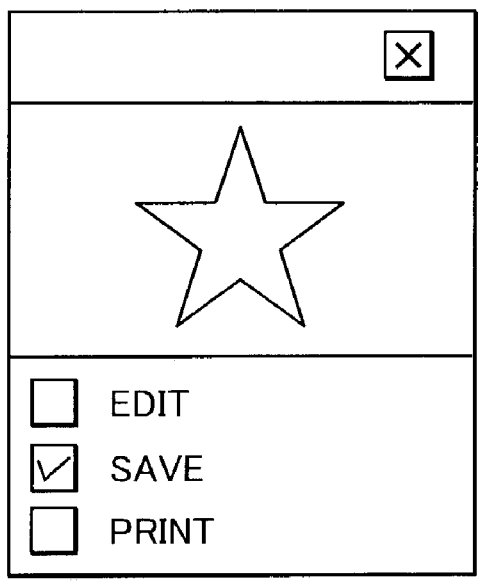
FIG. 11 is a conceptual drawing showing the display area of the assistant software according to another embodiment of the present invention.

While the invention has been described in detail with reference to specific embodiments thereof, it would be apparent to those skilled in the art that many modifications and variations may be made therein without departing from the spirit of the invention, the scope of which is defined by the attached claims. For example, only an "Edit" check box has been provided in the display area 43 in the embodiment described above. However, as shown in FIG. 11, a "Save" checkbox, for example, can also be provided in the display area 43. By providing this checkbox, the user can save desired data to the hard disk without displaying the tape editor. Further, a "Print" checkbox can also be provided in the display area 43, as shown in FIG. 11. With this construction, the user can easily specify a desired process and can also confirm at a glance which processes are currently being specified.

Figure 12:
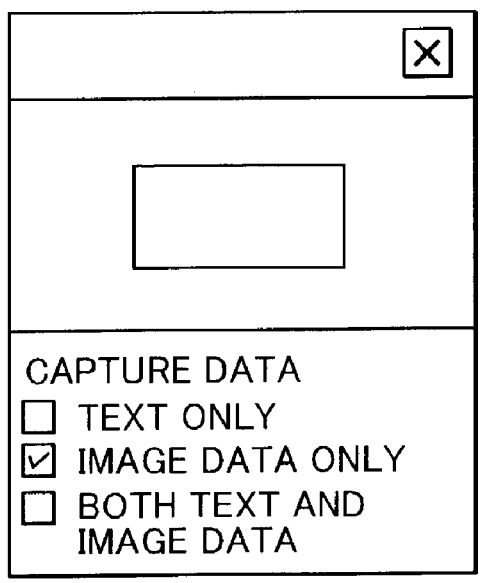
FIG. 12 is a conceptual drawing showing the display area of the assistant software according to another embodiment of the present invention.

In the embodiment described above, the assistant software can be provided with three modes for capturing data from the data selected in the browser according to the user's settings: a mode for capturing only text, a mode for capturing only image data, and a mode for capturing both text data and image data. This configuration can simplify the user's operations for data selection during a data capture operation. The method for setting the mode can be implemented by the checkbox format, as shown in FIG. 12. Further, it is possible to set the mode collectively for all "edit," "save," and "print" operations or to set the modes individually for each operation.

When a portion of the captured text data is a description in the HTML link format, this data can be displayed in and printed from the tape editor in the same format displayed in the browser, or the data content at the link destination (text or image) can be developed and printed (for example, as a thumbnail image).

In the embodiment described above, the concentric circle mark (◎), triangular mark (Δ), and square mark (□) are displayed based on actions by the user. However, the present invention is not limited to these symbols. Other characters can be used. It is also possible to change the symbol color or background color in the display area in response to different actions by the user.

INDUSTRIAL APPLICABILITY

As described above, the present invention enables the user to perform quick data processing through simple operations, without requiring a second application to be pre-started and without requiring the user to perform an operation to start the second application. Further, the user need not be concerned with the second application, but can concentrate on the first application while capturing data and can therefore quickly and smoothly perform a data capture.

The invention claimed is:

1. A data processing device for executing data processes using a first application and a second application according to input operations, the input operations performed based on data displayed on a display device, the data processing device comprising:
 a data capture controller that selects desired data from data displayed on a first display window of the display device through a process performed in the first application;
 a data supply controller that supplies the desired data as supplied data selected by the data capture controller to the second application as an object of a preset data process of the second application, without a user starting up the second application; and
 a process command unit that executes the preset data process on the supplied data using the second application,
 wherein the preset data process includes at least one of printing contents of the supplied data and generating a second display window on the display device to allow the user to edit the supplied data, the second display window being different from the first display window;
 wherein the data supply controller includes a third application; and
 wherein the third application is a resident program that is constantly running while a device relating to the second application is powered on, the third application indicating a status of data capture or a process run by the second application.

2. A data processing device as claimed in claim 1, further comprising a process specifying indicator that specifies a data process to be executed by the second application on data supplied to the second application from the data supply controller.

3. A data processing device as claimed in claim 2, wherein the second display window of the second application is automatically started at a time data is selected by the data capture controller when an edit process is specified by the process specifying indicator.

4. A data processing device as claimed in claim 2, wherein a display controller visibly displays an indication of the data process specified by the process specifying indicator in a prescribed display area on the display device as a data process to be executed by the second application.

5. A data processing device as claimed in claim 1, wherein a selecting operation is performed on the desired data selected by the data capture controller by moving the selected desired data to a prescribed display area on the display device through any of a drag-and-drop operation, an image capture operation, and a copy operation.

6. A data processing device as claimed in claim 5, wherein the data capture controller comprises a data type specifying indicator that specifies a type of data to be supplied to the second application; and the data supply controller supplies to the second application only the type of data specified by the data type specifying indicator from among the desired data selected by the data capture controller.

7. A data processing device as claimed in claim 5, further comprising a display controller that modifies a size of the prescribed display area.

8. A data processing device as claimed in claim 7, wherein a display controller controls the display device such that the prescribed display area is always displayed on top, even when the first and second display windows overlap the prescribed display area.

9. A data processing device as claimed in claim 8, wherein the display controller displays different content in the prescribed display area according to a specified data process or executing status of a data process.

10. A data processing device as claimed in claim 9, wherein the display controller displays characters or symbols corresponding to the specified data process or the executing status of the data process.

11. A data processing device as claimed in claim 5, further comprising a process specifying indicator that specifies a process to be executed by the second application on the desired data supplied to the second application from the data supply controller.

12. A data processing device as claimed in claim 11, wherein the display controller visibly displays an indication of the process specified by the process specifying indicator in the prescribed display area as a process to be executed by the second application.

13. The data processing device as claimed in claim 1, wherein the first application is an Internet browser that displays contents of Internet websites.

14. A data processing device as claimed in claim 1, wherein the non-editing process includes at least one of printing contents of the supplied data and saving the supplied data in a storage device.

15. A data processing method for executing data processes using a first application and a second application according to input operations, the input operations performed based on data displayed on a display device, the method comprising:
 selecting desired data from data displayed in a first display window on the display device through a process performed in the first application;
 supplying the desired data as supplied data to the second application as an object of a preset data process of the second application without a user starting up the second application; and
 executing the preset data process on the supplied data using the second application,
 wherein the preset data process includes at least one of printing contents of the supplied data and generating a second display window on the display device to allow the user to edit the supplied data, the second display window being different from the first display window;
 wherein the supplying the desired data includes using a third application; and
 wherein the third application is a resident program that is constantly running while a device relating to the second application is powered on, the third application indicating a status of data capture or a process run by the second application, the data processing device being a device on which the data processes are executed.

16. The data processing method as claimed in claim 15, wherein the first application is an Internet browser that displays contents of Internet websites.

17. A data processing method as claimed in claim 15, wherein the non-editing process includes at least one of printing contents of the supplied data and saving the supplied data in a storage device.

18. A computer-readable product including computer-executable instructions for controlling a computer to function as a data processing device that performs data processing through first and second applications according to input operations, the input operations performed based on data displayed on a display device, the instructions including:

instructions for selecting desired data from data displayed in a first display window on the display device through a process performed in the first application;

instructions for supplying the desired data as supplied data to the second application as an object of a preset data process of the second application, without a user starting up the second application; and instructions for executing the preset data process on the supplied data using the second application, wherein the preset data process includes at least one of printing contents of the supplied data and generating a second display window on the display device to allow the user to edit the supplied data, the second display window being different from the first display window;

wherein the instructions for supplying the desired data include using a third application; and wherein the third application is a resident program that is constantly running while a device relating to the second application is powered on, the third application indicating a status of data capture or a process run by the second application.

19. The computer-readable product as claimed in claim 18, wherein the first application is an Internet browser that displays contents of Internet websites.

20. A computer-readable product as claimed in claim 18, wherein the non-editing process includes at least one of printing contents of the supplied data and saving the supplied data in a storage device.

* * * * *